US006595142B2

(12) United States Patent
Christensen

(10) Patent No.: US 6,595,142 B2
(45) Date of Patent: Jul. 22, 2003

(54) FLOOR FOR A TRANSPORT MEANS AND PROFILES FOR THE CONSTRUCTION THEREOF AS WELL AS A VEHICLE PROVIDED WITH SUCH A FLOOR

(75) Inventor: Martin Christensen, Tinglev (DK)

(73) Assignee: M.C.M. Holding A/S, Tinglev (DK)

( * ) Notice: Subject to any disclaimer, the term of this patent is extended or adjusted under 35 U.S.C. 154(b) by 0 days.

(21) Appl. No.: 10/119,076

(22) Filed: Apr. 10, 2002

(65) Prior Publication Data

US 2002/0178968 A1 Dec. 5, 2002

Related U.S. Application Data

(63) Continuation of application No. 09/554,270, filed as application No. PCT/DK98/00494 on Nov. 13, 1998, now abandoned.

(30) Foreign Application Priority Data

Nov. 13, 1997 (DK) .............................................. 1289/97

(51) Int. Cl.[7] .................................................. B61D 3/00
(52) U.S. Cl. ........................ 105/375; 109/422; 248/429
(58) Field of Search ................................. 105/422, 375; 248/429; 297/344.13, 344.18; 52/377

(56) References Cited

U.S. PATENT DOCUMENTS

| 2,607,301 A | * | 8/1952 | Lundvall ..................... 105/375 |
| 3,269,072 A | * | 8/1966 | Black ......................... 105/422 |
| 3,392,954 A | * | 7/1968 | Malitte ....................... 248/429 |
| 3,399,636 A | * | 9/1968 | Krug, Jr. ..................... 105/422 |
| 3,652,050 A | * | 3/1972 | Marrujo et al. ............. 248/429 |
| 5,848,775 A | * | 12/1998 | Isomura et al. ............. 248/429 |
| 5,961,088 A | * | 10/1999 | Chabanne et al. .......... 248/429 |

FOREIGN PATENT DOCUMENTS

EP   0619216 A2  * 10/1994

* cited by examiner

Primary Examiner—S. Joseph Morano
Assistant Examiner—Lars A. Olson
(74) Attorney, Agent, or Firm—Dykema Gossett PLLC

(57) ABSTRACT

A floor for a means of transport which includes a floor plate (1) adapted to the bottom (12) of a given means of transport, and on which one or more chairs or other aids in passenger transport may be secured, the floor plate (1) including a plurality of recesses (3, 7) distributed in a suitable pattern (3a, 3b) for receiving securing means (6) for securing chairs or the like to the floor plate (1) and receiving attachment means (13) for attaching the floor plate (1) to the bottom (12). This provides a floor having a much greater flexibility with respect to layout, e.g., as found in minibuses, just as the chairs may be secured more securely to the floor, so that also the floor can absorb impact energy in case of a collision where a passenger fastened by a seat belt is thrown forwards.

12 Claims, 9 Drawing Sheets

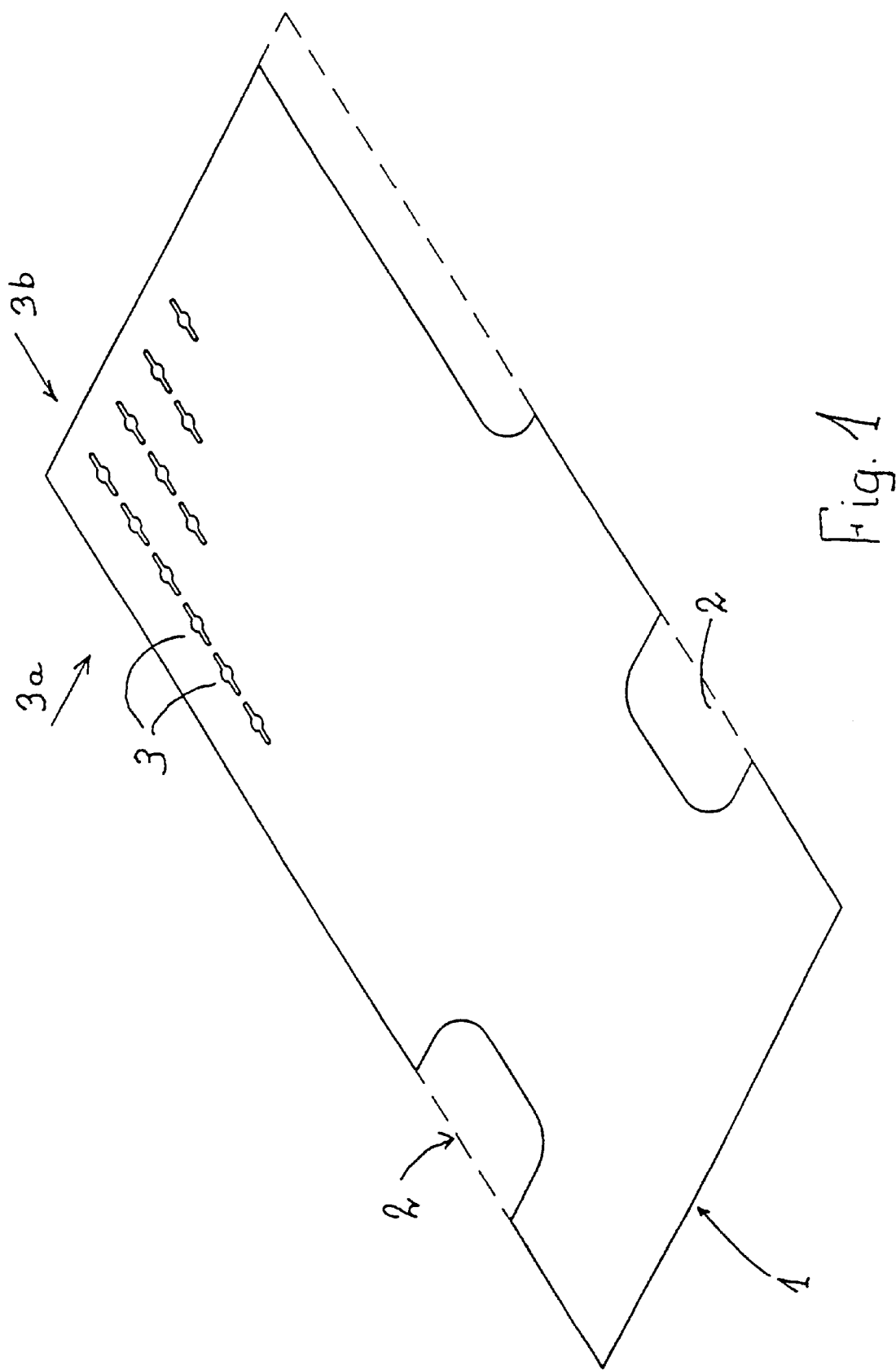

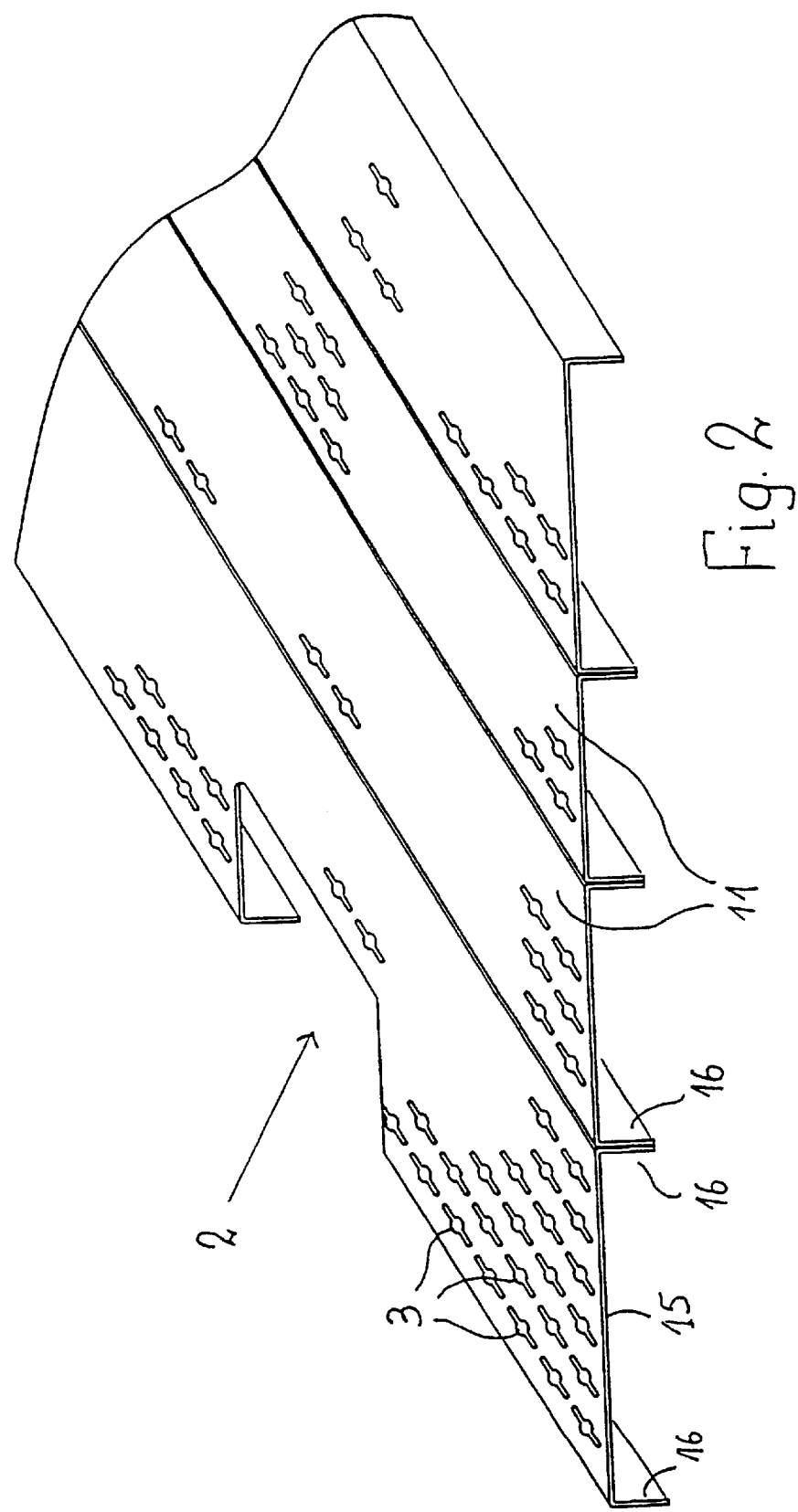

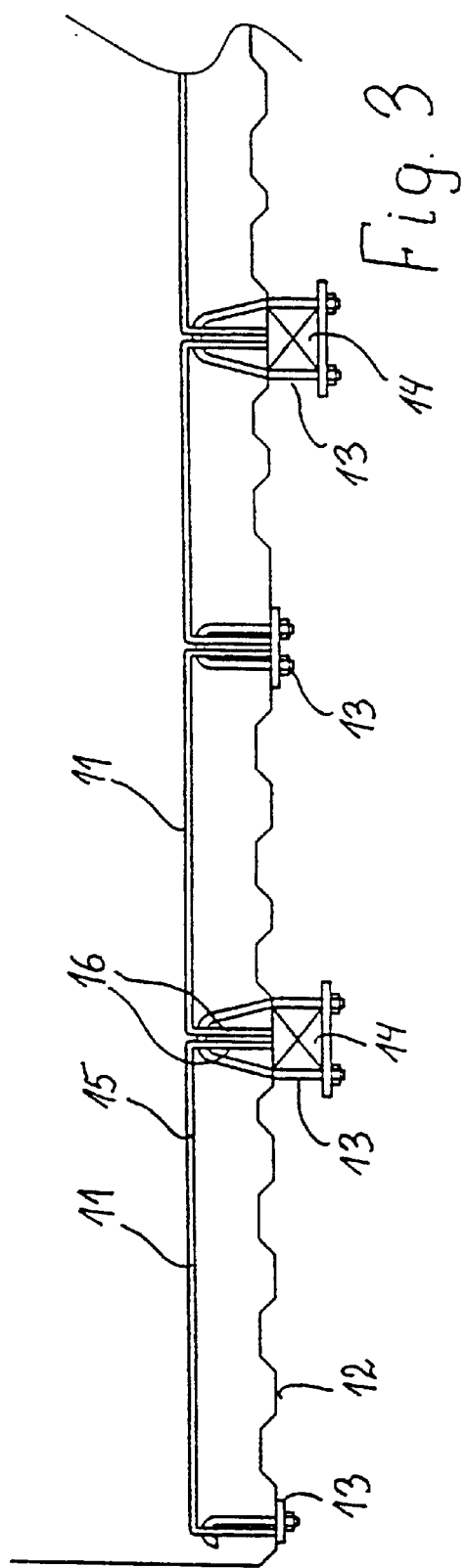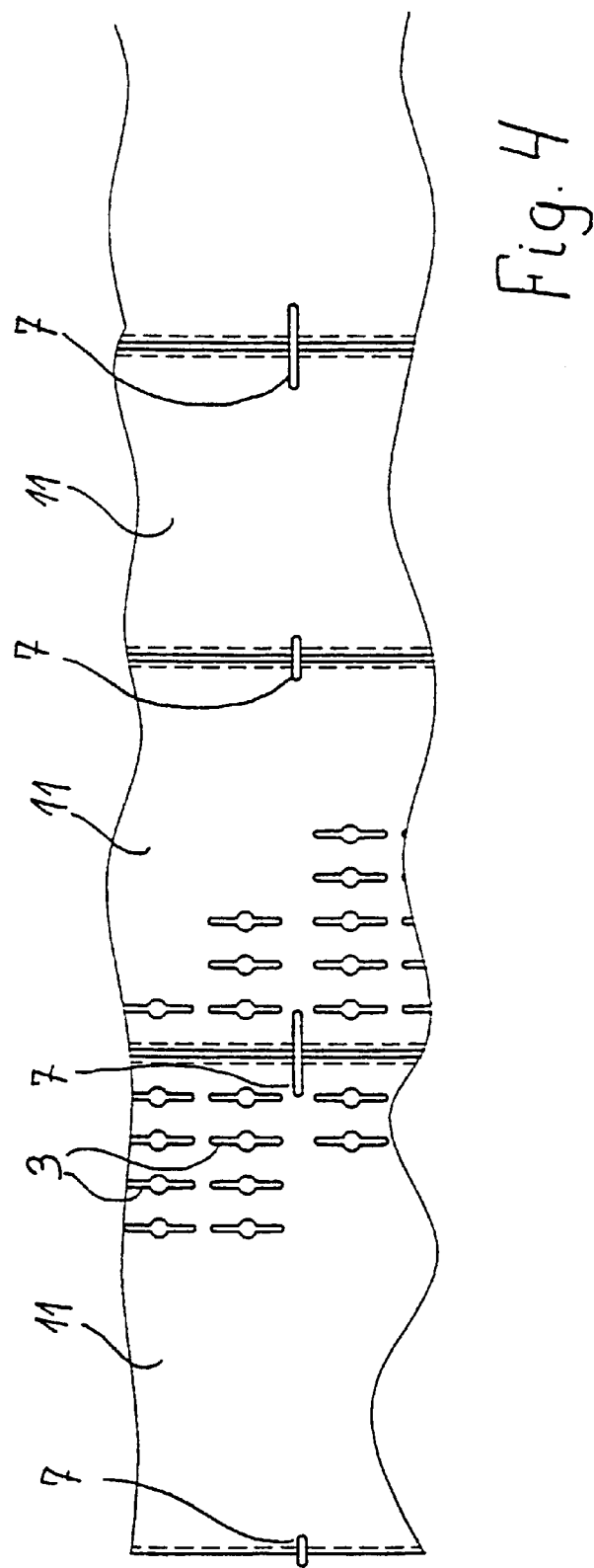

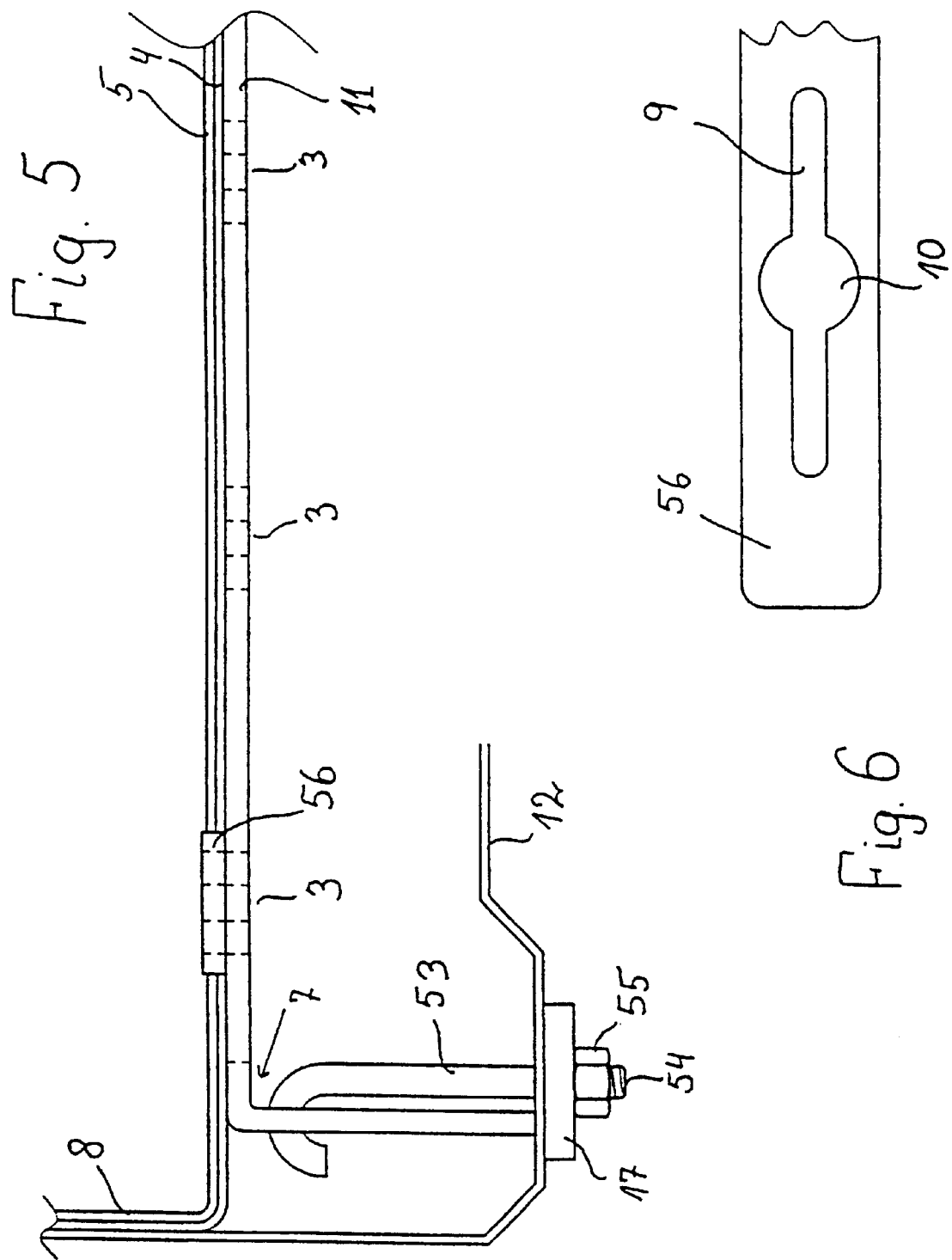

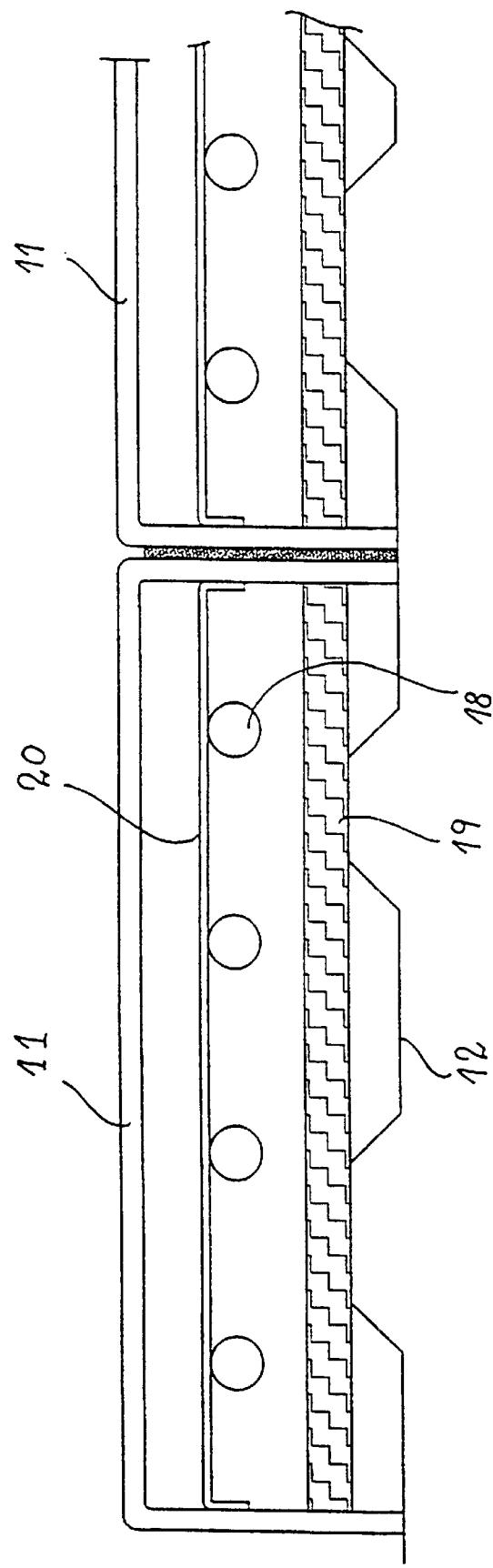

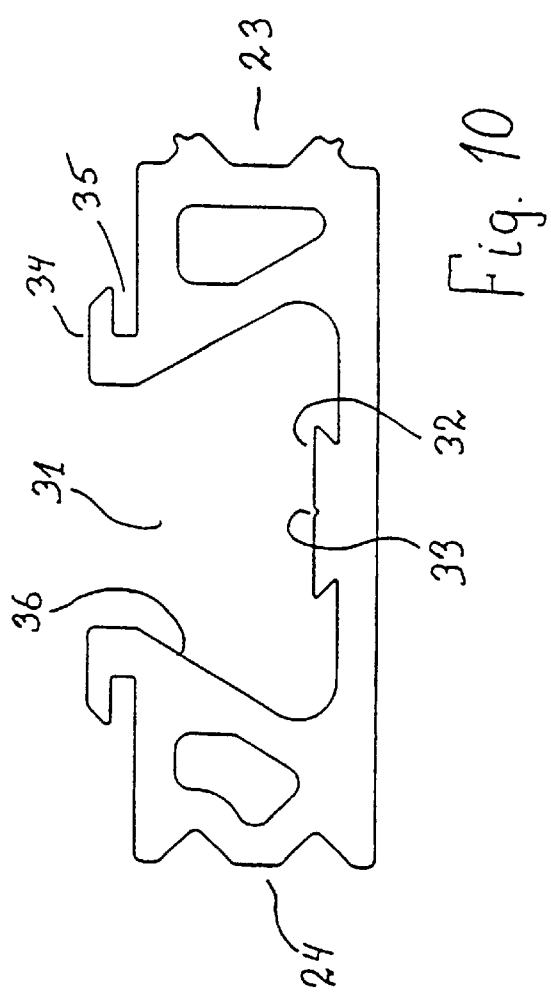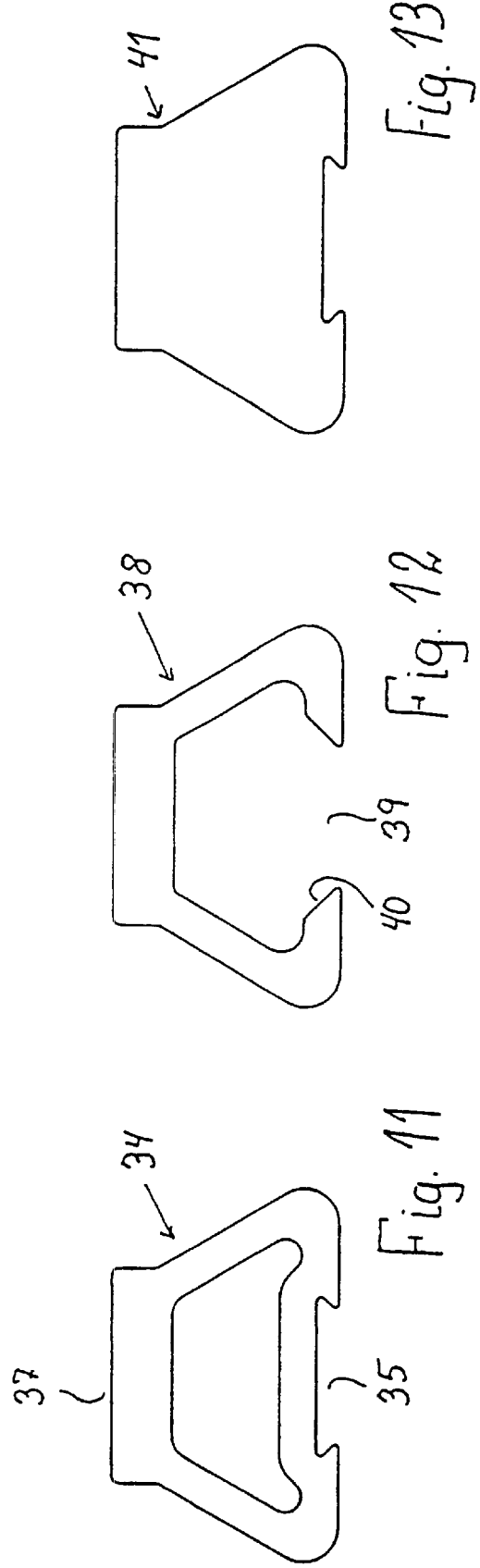

FLOOR FOR A TRANSPORT MEANS AND PROFILES FOR THE CONSTRUCTION THEREOF AS WELL AS A VEHICLE PROVIDED WITH SUCH A FLOOR

CROSS-REFERENCE TO RELATED APPLICATION

This is a continuation of application Ser. No. 09/554,270, filed Jun. 13, 2000, now abandoned, which was a national phase of PCT/DK98/00494, filed Nov. 13, 1998.

BACKGROUND OF THE INVENTION

1. Field of the Invention

The present invention relates to a floor for a means of transport of the type where the floor includes a plate which is adapted to the bottom of a given means of transport, and on which one or more chairs may be secured. The invention moreover relates to a profile for the construction of the floor and to a means of transport provided with such a floor.

2. The Prior Art

It is common practice that in vehicles for passenger transport, such as e.g. minibuses, a floor is installed within the vehicle body on the bottom of the vehicle body. Such a floor typically includes a plurality of plate elements separated by two or more rails, which extend longitudinally or transversely, and which are screwed or bolted to the vehicle bottom on which the seats are mounted. The seats in the cabin and the rails are adapted such that the seats may be secured to the rails.

It may be mentioned in this connection that EP-A-0 619 216 discloses a floor plate for minibuses and vans which is coated with an elastic layer of polyurethane, so that the floor is easier to lay, and so that it does not rattle when it is positioned on top of the vehicle bottom.

The plate elements are usually plywood which is covered by a carpet or vinyl covering. The plate elements may be interconnected below the rails or be separated by the rails, so that the rails are disposed in a form of track in the longitudinal direction of the plate. The plate is fixed to the vehicle bottom. The rails are screwed or bolted to the vehicle bottom, which is usually a profiled metal plate.

This provides flexibility in the selection of seating, as the seats may be moved forwards or backwards along the rails and be mounted in the desired arrangement. Particularly in case of larger means of transport, such as buses as well as trains or aircraft, the number of seats may thus also be changed relatively easily by moving the individual seats more or less together on the rails.

The seats may be provided with seat belts in the form of lap belts, so that, without further mounting operations, passengers may sit in a fastened position, no matter which seating is selected.

To increase the safety of passenger transport, it will be a requirement in many countries that also e.g. minibuses must have three-point seat belts on all seats, as is the case with cars.

When the passengers are fastened in three-point belts, the load of the suspension of the seat in the floor is increased significantly in case of a deceleration during an accident or in the case of a sudden application of the brakes. This increased impact is caused by the fact that also the torso of the passenger is fastened by the belt, which propagates to the mount of the seat in the rails. This makes additional demands on the attachment of the seat to the rail and consequently the attachment of the rail to the floor/bottom. This is intensified by double or triple seats.

The known types of floors for means of transport, however, cannot meet these demands, and accordingly the invention is intended to provide a floor which can satisfy these additional demands on the seat attachment because of the intensified demands on the use of seat-belts. Furthermore, in the known floor systems, the flexibility as to where the seats may be arranged on the floor rails is limited by the position of the rails, and, therefore, the invention is additionally intended to provide a floor which gives greater flexibility with respect to the positioning of seats.

SUMMARY OF THE INVENTION

The invention is directed to a floor of the type mentioned in the opening paragraph, where the floor plate is provided with a plurality of recesses distributed in a suitable pattern for receiving securing means for securing chairs to the plate and for receiving attachment means for attaching the floor plate to the bottom.

A floor plate according to the invention thus exhibits a perforated structure. A floor extremely flexible with respect to the arrangement of chairs is achieved hereby, as the attachment points no longer have to be on a linear rail, but may be selected freely. It is realized by the invention that only some of the recesses are used for the attachment of chairs. Other attachment recesses are used for the attachment of the floor to the bottom. The recesses which are not used, may be covered so that the floor with the mounted chairs will have a uniform surface without long openings like at the rails, which facilitates cleaning of the floor. It is moreover realized by the invention that the chair-carrying recesses may moreover be used for the attachment of other aids, such as e.g. wheel chairs. There are no standard dimensions for wheel chairs, and therefore it has previously not been possible to guarantee safe attachment of a wheel chair in passenger transport, but the floor according to the invention enables optimum fixing at all necessary points so that the wheel chair is securely fixed to the floor during transport.

When the chairs are secured in some recesses and the floor is attached to the means of transport in other recesses which are positioned in the vicinity of the chair-carrying recesses, the floor is capable of absorbing some impact energy in case of an accident. In contrast to the known types of floors, a floor according to the invention may be used as part of the passenger safety system of the means of transport. The floor according to the invention will be capable of being deformed, particularly if it is made of a metal plate, preferably an aluminium plate, since some weight may be saved hereby. With a floor according to the invention, it will be possible to make a floor for minibuses which satisfies the requirements for "M1" passenger vehicle approval.

The floor thus provides much more flexibility with respect to chair layout in e.g. minibuses. The chairs may be secured more safely to the floor, so that also the floor can absorb impact energy in case of a collision, where a passenger fastened in a seat belt is thrown forwards. It is moreover realized by the invention that the seat belts of the chair may be secured directly to the floor.

In a preferred embodiment of a floor according to the invention, the floor plate is arranged to be mounted in the bottom of the means of transport by means of at least one strap, which, optionally together with a segment of the floor, is fixed below the bottom of the means of transport. This results in a secure and strong attachment which does not take up much space, and which has an extremely low weight. The strap attachment may optionally be supplemented with a rubber strip for silencing the floor, if conditions so permit.

The attachment points for attaching the floor plate to the bottom may be shaped as slots immediately above the longitudinal joints between the profiles. This results in strong fixing, which also ensures that the surface of the floor remains plane.

In the preferred embodiment of a floor according to the invention, the plate is composed of a plurality of at least partly perforated floor profiles, whose longitudinal extent corresponds to the travelling direction of the means of transport, or transversely, if conditions so permit. The profiles are interconnected at their side flanges by welding, gluing or the like, or in that the side flanges are constructed as a tongue and groove connection. When the floor is composed of profiles, a cost-saving and extremely flexible construction of the floor according to the invention is achieved. Further, this construction means that the floor according to this preferred embodiment may be manufactured with a great strength relative to weight, in particular if the floor profiles, which are preferably made of aluminium, are shaped as U-profiles.

In a further embodiment, heating pipes for floor heating may be arranged inside the profiles between the bottom and the floor. This provides floor heating right below the passengers, which gives a better distribution of heat in the cabin than if merely ribbed pipe heating is installed in the side of the vehicle body. Optionally, an insulation material may be arranged on the underside of the heating pipes, if this is deemed necessary. If the profiles are of aluminium, the profile material, however, will contribute to conveying the heat upwards and into the cabin.

The floor plate may be composed of profiles of different widths, so that the attachment points may be adapted individually to the bottom of various types and makes of the means of transport.

In the preferred embodiment, each recess is shaped as an elongate hole with a reception opening for the securing means. This allows the chair to be mounted and removed easily. The reception opening may either be provided in the centre or at one end of the elongate hole.

The recesses may moreover be provided with mounting blocks where one or more of the mounting blocks are formed with the same recess as in the floor. The flooring is hereby protected against load from the legs of the chairs. The mounting block may be in the form of a band, if conditions so permit. The same floor type/the same perforated profile may hereby be used for several different mounting fittings for the attachment of chairs, auxiliary equipment or other equipment, merely by manufacturing suitable mounting blocks. This results in further constructional flexibility, in terms of production as well as use.

The floor according to the invention may moreover be provided with a flooring, e.g. vinyl or other covering, on an adapted floor plate, which is moreover formed with holes corresponding to the mounting positions for the selected cabin layout. The cover plate is placed on top of the floor plate so that a neat surface of the floor in the cabin is achieved in that the recesses which are not used for the mounting of chairs together with other recesses, such as attachment holes or the like, are covered. Such a plate is relatively simple and inexpensive to manufacture. If another seating is subsequently selected, a new cover plate is laid on the floor.

According to a second aspect, the invention provides a profile for a floor according to the first aspect of the invention. This profile exhibits a perforated surface and two side faces thereon, which are produced e.g. by bending.

Further, in a first embodiment, the profile is made of aluminium. It is realized in this connection that the profiles may alternatively be made of kevlar or a similar fibre material, if so permitted by the price and other conditions. This provides an extremely suitable starting element for the making of a floor according to the preferred embodiment of a floor according to the invention.

Finally, according to a third aspect, the invention relates to a means of transport, such as a bus, minibus or other vehicle, in which a floor according to the first aspect of the invention is mounted, said floor being preferably composed of profiles according to the second aspect of the invention.

The invention will be described more fully below with reference to the accompanying drawings.

BRIEF DESCRIPTION OF THE DRAWINGS

FIG. 1 shows a floor plate for a minibus according to the invention,

FIG. 2 shows a floor plate composed of profiles according to the preferred embodiment of the invention, FIG. 3 shows a schematic sectional view of the attachment of the floor to a vehicle/bottom, FIG. 4 shows a top view of a section of the floor plate in the attachment, FIG. 5 shows a sectional view through a floor according to the invention, FIG. 6 shows a mounting block and a preferred embodiment of the invention, FIG. 7 shows a sectional view of the floor with installed heating, FIG. 10 shows a cross-section of a main profile for use in the mounting of chairs or other aids, FIG. 11 shows a cross-section of an insert for use in connection with the profile shown in FIG. 10, FIG. 12 shows a cross-section of another embodiment of an insert, FIG. 13 shows a cross-section of a third embodiment of an insert.

DETAILED DESCRIPTION OF THE PREFERRED EMBODIMENTS

Figure 8:
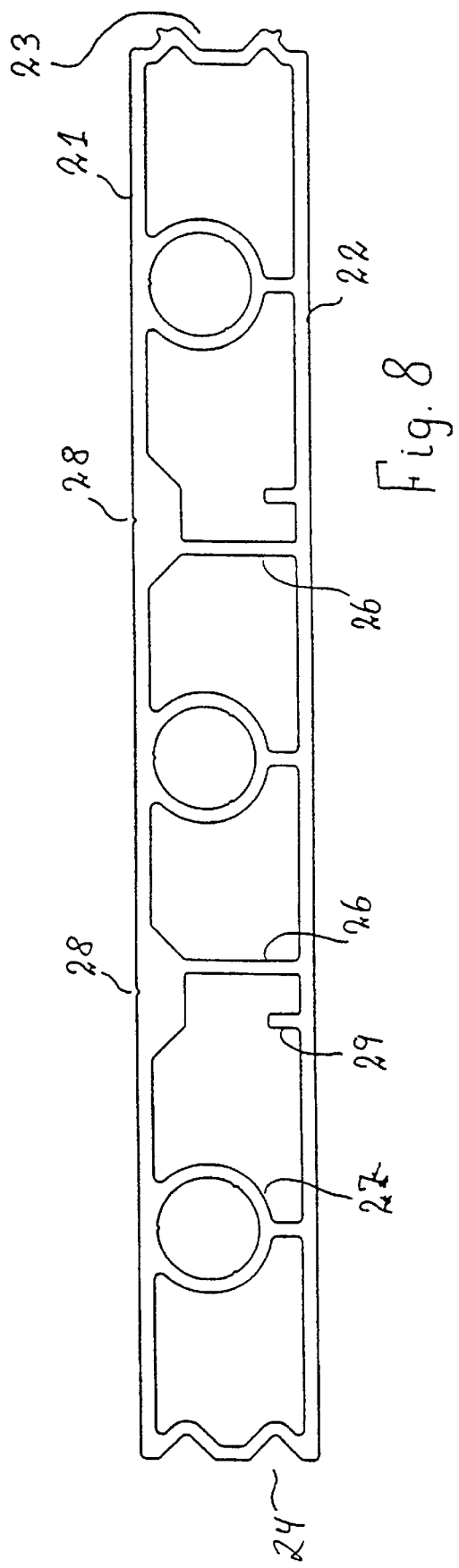
FIG. 8 shows a cross-section in a floor profile for use in the construction of a floor according to the invention.

FIG. 1 shows a floor plate 1 for a minibus in a first embodiment. It consists of a plate 1, e.g., of aluminium for reasons of weight, which is adapted to the shape of the bottom in the minibus or the van, as is shown by the reference numeral 2. The floor plate 1 is perforated with recesses 3 which are made in lines as shown at 3*a* and in rows as shown at 3*b* in FIG. 1.

FIG. 2 shows a preferred embodiment of a floor plate for a floor according to the invention, said plate being made by placing a plurality of U-profiles 11 side by side and joining them by welding, gluing (bonding) or the like. The U-profiles 11 are perforated with recesses 3, preferably in the same pattern as indicated in FIG. 1. At least the plate part 15 of the U-profiles 11 is provided with the recesses 3. Furthermore, the side flanges 16 in the profiles 11 may also be provided with recesses 3, which can make the production of the profiles easier and less expensive, as they may thus be bent from a perforated plate material.

A preferred material for the profiles 11 is aluminium, since a strong, but simultaneously light floor structure is obtained hereby.

The floor plate, which is thus composed of reversely positioned U-profiles, is attached, as shown in FIG. 3, to the bottom of the vehicle 12 by means of straps 13, which are passed through some attachment recesses 7 in the floor plate and down below the bottom 12 of the vehicle, optionally below one of the side members 14. As shown in FIG. 3, the straps 13 and the attachment in the bottom 12 may be made in different ways. These recesses 7 are produced by milling of slots 7 at the joint between two profiles 11. The strap 13 at the top will hereby be positioned at the same level as or below the surface of the floor, so that the floor will have a plane appearance. The floor plate consisting of the assembled U-profiles 11 exhibits a plurality of longitudinal, vertical reinforcement flanges in the form of two mutually engaging side flanges 16 from two adjacent profiles. The attachment of the floor plate takes place via one or more of these reinforcement flanges, as shown in FIG. 3. It is moreover ensured by this attachment that the fixing force from the strap 13 propagates directly down into the side faces 16 of the profiles 11.

FIG. 4 shows a top view of the attachment, from which it appears clearly that the attachment recesses 7 are cut or produced in another manner in the surface of the floor at the profile joints. As will be seen, the size of the recesses 7 depends on the selected form of the straps. It has moreover been realized that the form of recesses and attachment may be selected freely under the circumstances.

FIG. 5 shows a section through a floor according to the invention. A cover plate 4 is arranged on top of the floor plate 4, said plate being covered by a covering 5 in the form of flooring vinyl, a carpet material or other form of flooring. As will moreover be seen from FIG. 5, the recesses 3 not used are covered by the cover plate 4. A mounting block 56, on which a chair or the like may be mounted, is mounted at another of the shown recesses 3. A recess 7 accommodates a hook-shaped attachment 53 which at the top grips the plate in the recess 7, and which at the bottom is secured to the bottom 12 of the vehicle in that the hook 53, which has threads 54 at the bottom, is pulled downwards toward the bottom 12 by tightening of a nut 55, which engages the bottom 12 via a plate member 17 in the form of a washer or the like.

FIG. 6 shows a schematic view of a mounting block 56. It shows a preferred embodiment of the recesses 3 for the attachment of chairs to the floor plate 1. This embodiment of the recess 3 is correspondingly provided in the mounting block 56. The embodiment consists of an elongate hole 9 with a reception opening 10 in the centre through which the screw head from a chair or the like may be inserted. Alternatively, the reception opening 10 may be arranged at one end of the elongate hole 9.

The mounting block 56 may be formed as individually arranged blocks or as a band comprising a row of recesses 3, if the selected seating so permits.

FIG. 7 shows a section through a floor according to the invention which is equipped with heating pipes 18, and an insulation plate 19 is laid on or immediately above the bottom 12. The heating pipes 18 may be secured to a lower plate 20 which is secured inside the profiles. This plate 20 may optionally be made of aluminium like the profiles 11, thereby ensuring a good conduction of heat upwards and into the cabin.

It has moreover been realized in this connection that a this plate 20 may be used as a "collection tray" for dirt. Thus the floor may easily be cleaned by means of water or compressed air, which prevents accumulation of too much dirt.

A further development of the floor according to the invention is illustrated in FIGS. 8–13 of the drawing in the form of a modular system consisting of profiles of extruded aluminium. The floor profile shown in FIG. 8 is a closed profile having an upper side 21 and a lower side 22 and two side edges 23, 24 which are constructed as a tongue and groove connection. For reasons of strength, the profile is divided by partitions 26. Further, channels 27 of a circular cross-section are provided in the profile. These likewise contribute to the strength, and they may also be used as heating pipes. This may be either directly where the channels are interconnected through an end member, or indirectly by running a separate heating coil in the channels. Since the upper side of the pipe wall is integrated with the upper side of the profile, a good conduction of heat is obtained in the upper side, while the rib connection with the lower side results in insulation with respect thereto.

At the partitions 26, the upper side of the profile is provided with longitudinal "centre grooves" for screws or bore holes. For unique positioning of these, the profile interiorly has a longitudinal flap 29 in parallel with the partitions, which causes deformation of the profile when the screws are tightened. It will be appreciated that the other cavities in the profile are suitable for the running of electric or light guide cables.

Figure 9:
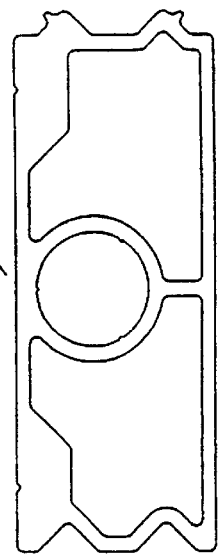
FIG. 9 shows a cross-section of a fitting piece of the floor profile.

FIG. 9 of the drawing shows a fitting piece 30 having a width corresponding to one third of the width of the floor profile. It will be appreciated that additional fitting pieces may be made of course, as needed.

At the places where the rows of chairs are to be, profiles are arranged below the legs, having a cross-section as shown in FIG. 10 with side edges similar to those of the main profile. The profile has a longitudinal dovetail key 31 for the insertion of inserts, as shown in FIGS. 11–13. The bottom of the key 31 has a dovetail 32 with a "centre" groove 33 for attachment of the profile with screws or bolts. The upper side, at each side of the dovetail key, is formed with a flap 34 having a key 35 down towards the upper side of the profile for securing the edge on the flooring.

As mentioned, FIGS. 11–13 of the drawing show cross-sections of inserts for insertion into the keys. The insert 34 is shown in FIG. 11 as a closed profile whose lower side has a key 35 for receiving the dovetail 32 when the insert is inserted into the profile shown in FIG. 10. In addition to engaging the inclined walls 36 in the profile, the bottom of the insert is secured with the dovetail 32. Holes are milled or pre-drilled in the upper side 37 of the insert for the attachment of the chairs or other aids.

The insert 38 shown in FIG. 12 differs from the foregoing exclusively in that it is an open profile, more particularly in that it is open 39 at the bottom and has inclined edges 40 which fit below the edges on the dovetail 32 at the bottom of the profile in FIG. 10. The insert 38 is typically used where the mounting profile shown in FIG. 10 is secured with screws or bolts in the bottom.

The insert 41 shown in FIG. 13 differs from the insert shown in FIG. 11 exclusively in that it is a solid profile, which is used where extreme loads may occur.

Figure 14:
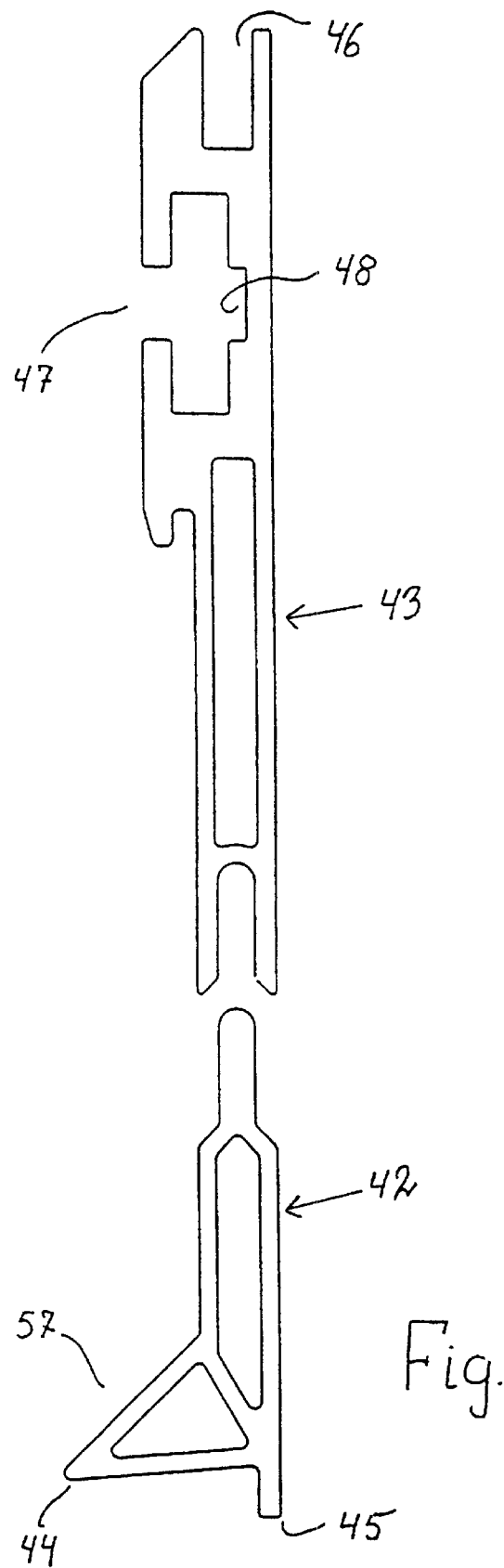
FIG. 14 shows a cross-section of a panel profile.

A panel profile as shown in FIG. 14 may be used as a termination toward the sides of the vehicle. The profile is formed by lower and upper parts 42, 43, the lower part having a triangular moulding 57 whose outer end 44 is intended to rest on the upper side of the floor profiles. The profile is kept in position with a downwardly directed flap 45 which is wedged down between the inner side of the vehicle and the floor profile adjoining it. The second part 43 of the panel profile is connected with the first part 42 by a tongue and groove connection. The upper edge of the second profile part 43 is formed with a key 46 for receiving the lower edge of the side covering in the vehicle. In addition, there is a longitudinal key 47 in which various fittings may be arranged, e.g. fittings for the attachment of chairs, other aids or equipment. The bottom of the key 47 has a countersink 48 for securing the profile with screws or bolts so that their heads do not extend blockingly into the hollow of the key.

Figure 15:
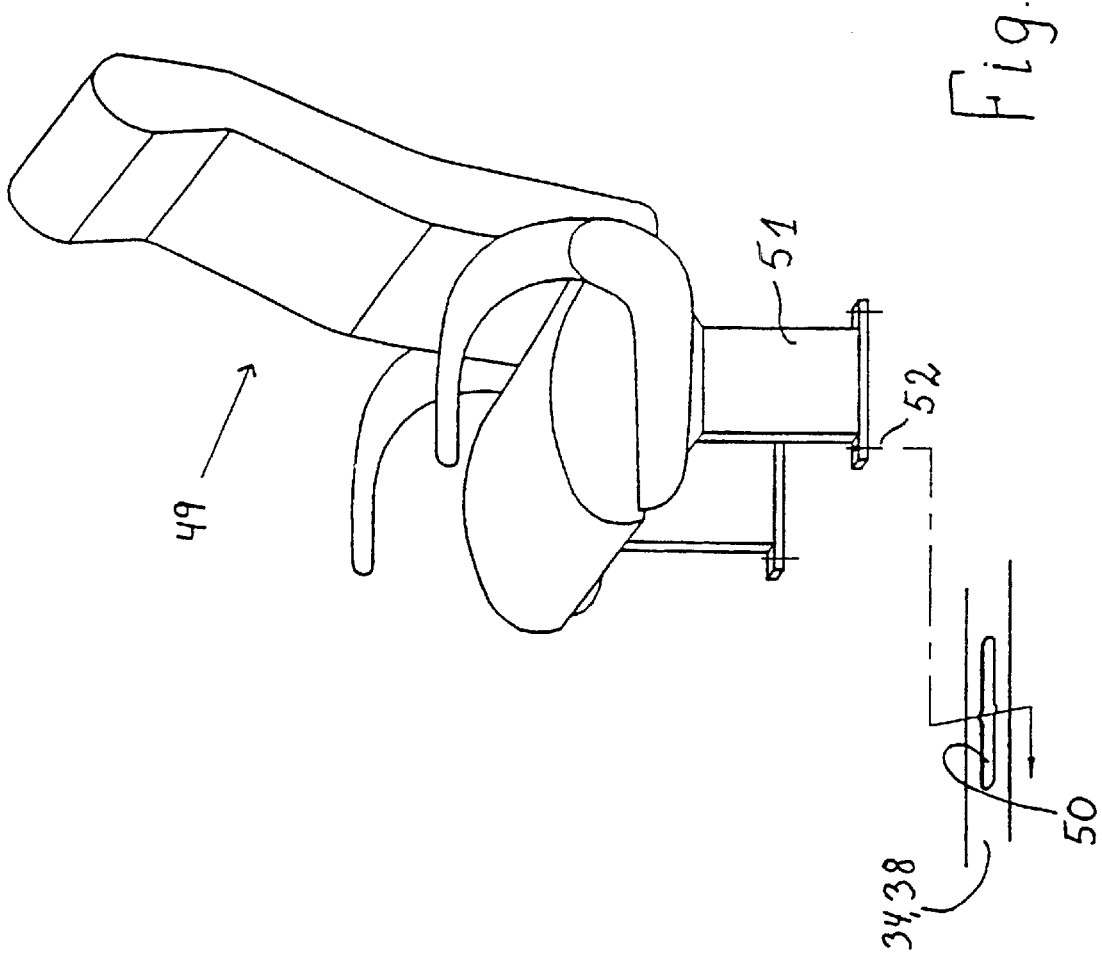
FIG. 15 shows the principle in the mounting of a chair.

FIG. 15 of the drawing shows by way of principle how a chair 49 is secured to the floor. As mentioned, the upper side of the insert 34 or 38 is formed with mounting holes 50 like the previously mentioned holes shown in FIG. 6 of the drawing. The chair is placed with the legs 52 on a pair of profiles 34, 38 intended for the purpose, so that the screws may be inserted into the expanded part 10 of the holes. The chair is then pushed backwards and forwards to seat the shank of the bolt 52 in the slot 9. When the bolts have been tightened, the chair is fixedly mounted. By performing the reverse operation, the chairs may readily be dismounted and removed. The mounting of the chairs by means of the solid insert 41 may take place in two ways, depending on whether the insert is provided with milled or pre-drilled holes or not. In the first-mentioned case, the mounting takes place like with the inserts 34, 38, while in the last-mentioned case holes are milled or drilled where the chairs or the aids are to be arranged.

It has previously been stated that the profiles may be screwed or bolted to the bottom of the vehicle, just as they may be riveted. Where a plate-shaped floor is involved, as shown in FIG. 1, or closed profiles are involved, as shown in FIGS. 8–10, it is also possible to glue or bond the floor to the bottom of the vehicle.

What is claimed is:

1. A method of mounting chairs in a means of transport comprising the steps of (1) providing a floor plate (1) formed by a plurality of parallel and interconnected floor profiles (11) which are constructed as plane or substantially plane pipe profiles and which including a plurality of recesses (3, 31, 47) distributed in a suitable pattern for receiving securing means for securing chairs, (2) attaching said floor plate (1) to a bottom (12) of said means of transport, and (3) securing chairs, (2) attaching said floor plate (1) to a bottom (12) of said means of transport, and (3) securing chairs in structural attachment with said floor plate (1) using said recesses (3, 31, 47).

2. A method according to claim 1, wherein in step (1) the floor plate (1) is formed by interconnection of floor profiles (11) via side flanges (16) by welding, gluing, or tongue and groove connection.

3. A method according to claim 1, wherein in step (2) the floor plate (1) is glued to the bottom (12).

4. A floor for a means of transport comprising a bottom (12) with an upper side, where a floor plate (1) is adapted and attached to said bottom (12), said floor plate (1) being placed on said upper side of said bottom (12), where said floor plate (1) is formed by a plurality of parallel and interconnected floor profiles, which floor profiles are constructed as plane or as substantially plane pipe profiles, said floor profiles being interconnected via side flanges (23, 24) by gluing or welding, which floor plate (1) comprises a plurality of recesses (31, 47) distributed in a suitable pattern for receiving securing means for securing chairs, where the floor plate (1) is attached to the bottom (12) at least by gluing and where chairs are placed and secured in structural attachment with said floor plate (1) using said recesses (31, 47) independently of said bottom (12).

5. A floor according to claim 4, including heating pipes (19, 27) located inside the floor profiles (11).

6. A floor according to claim 4, wherein said profiles (11) have different widths.

7. A floor according to claim 4, wherein each recess (3) is shaped as an elongate hole (9) with a reception opening (10) for the securing means, said reception opening (10) being positioned in the center or at one end of the hole (9).

8. A floor according to claim 7, wherein the floor plate (1) above the recesses (3) includes mounting blocks (56) which are formed with a hole of the same shape as the recesses (3) in the floor plate (11) for the securing means.

9. A floor according to claim 4, wherein a flooring (5) is laid on a cover plate (4) which is formed with holes corresponding to the mounting positions of the selected cabin layout, said cover plate (4) being placed on top of the floor plate (1).

10. A floor according to claim 4, wherein the floor plate (1) comprises at least one floor profile (11) having a longitudinal key (31) for the insertion of an insert (34, 38, 41) in which mounting recesses are provided.

11. A floor according to claim 10, wherein the least one floor profile (11) is formed with pipe channels (27) whose upper part is integrated with an upper side of the profile and separated from a lower side.

12. A floor according to claim 4, wherein the floor profiles (11) are made of aluminum.

\* \* \* \* \*